(12) United States Patent
Bauer et al.

(10) Patent No.: US 7,922,800 B2
(45) Date of Patent: *Apr. 12, 2011

(54) INK SET, INK SYSTEM AND METHOD FOR PRINTING AN IMAGE

(75) Inventors: Stephen W. Bauer, San Diego, CA (US); Zeying Ma, San Diego, CA (US); Gregg A. Lane, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

This patent is subject to a terminal disclaimer.

(21) Appl. No.: 11/830,931

(22) Filed: Jul. 31, 2007

(65) Prior Publication Data

US 2009/0033729 A1    Feb. 5, 2009

(51) Int. Cl.
*C09D 11/02* (2006.01)
*B41J 2/01* (2006.01)

(52) U.S. Cl. .................. 106/31.6; 106/31.77; 347/100

(58) Field of Classification Search ............... 106/31.6, 106/31.77; 347/100
See application file for complete search history.

(56) References Cited

U.S. PATENT DOCUMENTS

| | | |
|---|---|---|
| 5,204,208 A | 4/1993 | Paine et al. |
| 5,679,141 A | 10/1997 | McInerney et al. |
| 5,766,738 A | 6/1998 | Phillips et al. |
| 6,715,869 B1 | 4/2004 | Reem et al. |
| 7,122,081 B2 | 10/2006 | He et al. |
| 7,478,903 B2 * | 1/2009 | Ma et al. ........................ 347/100 |
| 7,591,889 B2 * | 9/2009 | Stoffel et al. ................ 106/31.6 |
| 2004/0187732 A1 * | 9/2004 | Roman et al. ................ 106/31.6 |
| 2004/0239738 A1 * | 12/2004 | Watanabe ..................... 347/100 |
| 2005/0284329 A1 | 12/2005 | Jackson et al. |
| 2006/0075925 A1 | 4/2006 | Stoffel et al. |
| 2007/0046748 A1 | 3/2007 | Sano et al. |
| 2007/0046751 A1 | 3/2007 | Hamajima et al. |
| 2009/0033728 A1 * | 2/2009 | Ma et al. .................... 106/31.77 |

FOREIGN PATENT DOCUMENTS

| | | |
|---|---|---|
| EP | 1746138 A1 | 1/2007 |
| JP | 2005041906 | 2/2005 |
| WO | WO 2007/060254 | 5/2007 |

OTHER PUBLICATIONS

U.S. Appl. No. 60/903,921, filed Feb. 28, 2007, Donovan et al.
WO search report dated Feb. 10, 2009.

* cited by examiner

*Primary Examiner* — Helene Klemanski (57) ABSTRACT

An ink set includes a light magenta ink and a dark magenta ink. The light magenta ink includes an effective amount of a pigment having a red/green lambda cutoff ranging from about 585 nm to about 600 nm, and reflecting at least about 14% of blue light at a wavelength of about 470 nm when measured at a density at which the light magenta ink provides a maximum magenta chroma. The dark magenta ink includes an effective amount of a pigment having a red/green lambda cutoff greater than or equal to about 605 nm.

22 Claims, 4 Drawing Sheets

INK SET, INK SYSTEM AND METHOD FOR PRINTING AN IMAGE

BACKGROUND

The present disclosure relates generally to ink sets, ink systems, and methods of printing an image.

Inkjet printing or recording systems are commonly used as an effective way of producing images on a print medium, such as paper. Generally, ink droplets are ejected from a nozzle at high speed by the inkjet recording system onto the paper to produce an image (e.g., graphics, text, and/or combinations thereof) thereon. It is generally desirable to utilize an inkjet ink that produces both aesthetically pleasing images and long lasting print characteristics. Examples of such print characteristics include print quality (e.g., saturation, chroma, and/or the like) and durability (e.g., water fastness, water resistance, fade resistance, permanence, acid and alkaline high-liter smear resistance, and/or the like). In some instances, however, trade off(s) may occur between the various print quality characteristics when inks are deposited on the print medium. For example, when ink systems include the same or similar pigments for both light and dark inks, a trade off may exist between saturation and chroma.

BRIEF DESCRIPTION OF THE DRAWINGS

Features and advantages of embodiment(s) of the present disclosure will become apparent by reference to the following detailed description and drawings.

DETAILED DESCRIPTION

Embodiments of the ink set disclosed herein include light and dark magenta inks having pigments with different red/green lambda cutoffs. Without being bound to any theory, it is believed that the respective pigments advantageously enable printing of bright chromatic reds or dark saturated reds. The pigment selected for the light magenta ink also advantageously enhances blue chroma.

"Lambda cutoff", as used herein, is determined by measuring the spectral reflectance of ink when printed on media at an ink density sufficient to achieve maximum chroma, and measuring the wavelength, or lambda, at which the reflectance is the average between minimum reflectance and maximum reflectance. It is believed that the reflectance slope is greatest at this point, and thus the lambda associated with this point is well defined.

The phrases "solid solution pigment" and "pigment solid solution," as used herein, refer to a pigment crystal formed of a homogenous solution in its solid phase.

The phrase "effective amount," as used herein, refers to the minimal amount of a substance and/or agent, which is sufficient to achieve a desired and/or required effect. For example, an effective amount of a "pigment" is the minimum amount required to form an ink having maximum chroma.

As previously mentioned, embodiments of the ink set disclosed herein include the light magenta ink and the dark magenta ink. Each of the inks also includes an ink vehicle. As used herein, the term "ink vehicle" refers to the combination of water and solvents (and additives, if desired) to form a vehicle in which a colorant is placed to form an embodiment of the ink composition. It is to be understood that a variety of components in varying amounts may be used as the ink vehicle. Such ink vehicles may include a mixture of different components including, for example, solvents (e.g., aliphatic alcohols, aromatic alcohols, diols, glycol ethers, polyglycol ethers, caprolactams, formamides, acetamides, long chain alcohols, and/or combinations thereof), buffers, biocides, fungicides, and other microbial agents, viscosity modifiers, surface-active agents (surfactants such as, for example, alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and/or combinations thereof), salts, sequestering agents (e.g., EDTA), metal chelators, and water.

The light magenta ink includes an effective amount of a pigment having a red/green lambda cutoff ranging from about 585 nm to about 600 nm. The light magenta ink also reflects at least about 14% of blue light at a wavelength of about 470 nm when measured at a density which is sufficient for the ink to provide maximum magenta chroma. Pigments that absorb more blue light at the desirable density and wavelength are generally undesirable, at least in part because images printed with such inks tend to exhibit reduced blue chroma.

A non-limiting example of a pigment exhibiting both the red/green lambda cutoff and the blue light reflectance suitable for the light magenta ink is a quinacridone of formula (A) or a mixture of different derivatives of formula (A) or a solid solution of formula (A):

where X and Y are each independently selected from a halogen, —OH, —NO$_2$, —CF$_3$, a C$_1$-C$_4$ alkyl group, a substituted C$_1$-C$_4$ alkyl group, branched alkyl groups, unbranched alkyl groups, a C$_1$-C$_4$ alkoxy group, a substituted C$_1$-C$_4$ alkoxy group, a phenyl group, a cyclohexyl group, a phenoxy group, —COOH, a —COO—C$_1$-C$_4$ alkyl group, —SO$_3$H, a phenylamino group, a benzamino group, —N(CH$_3$)$_2$, —SO$_2$NH$_2$, —SO$_2$N(CH$_3$)$_2$, a pyridino group, —CONH$_2$ or —CON(CH$_3$)$_2$, and wherein n is 0, 1, or 2.

A specific non-limiting example of a pigment exhibiting both the red/green lambda cutoff and the blue light reflectance suitable for the light magenta ink is CROMOPHTAL® Jet Magenta 2BC, which is available from Ciba Specialty Chemicals Inc., Tarrytown, N.Y.

It is believed that the characteristics of the pigment selected for the light magenta ink advantageously contribute to the printed light magenta ink exhibiting enhanced red chroma, enhanced blue chroma, reduced metamerism, or combinations thereof.

The dark magenta ink includes an effective amount of a pigment having a red/green lambda cutoff greater than or equal to about 605 nm. In a non-limiting example, the red/green lambda cutoff of the pigment in the dark magenta ink ranges from about 605 nm to about 640 nm. One example of a suitable pigment for the dark magenta ink includes, but is not limited to pigment red 122 (PR 122). It is also believed that pigment red 202 (PR 202) and other pigments which behave similarly may be used.

It is believed that the characteristics of the pigment selected for the dark magenta ink advantageously contribute to the printed dark magenta ink exhibiting enhanced red saturation.

For both the light and dark magenta inks, it is believed that the sharper the red/green lambda cutoff, the better the characteristics of the respective ink. Some of the theoretical examples provided hereinbelow have relatively steep lambda cutoffs. While the pigment examples given herein generally do not have lambda cutoffs as steep as the theoretical examples, it is believed that the non-limiting pigment examples and those pigments having steeper lambda cutoffs are suitable for use in embodiments of the inks disclosed herein.

In embodiments of the ink set disclosed herein, the ratio of effective amount of pigment in the light magenta ink to the effective amount of pigment in the dark magenta ink ranges from about 1:2 to about 1:5. As non-limiting examples, the effective amount of the pigment in the light magenta ink ranges from about 0.7 wt % to about 2 wt %, and the effective amount of the pigment in the dark magenta ink ranges from about 3 wt % to about 6 wt %.

Without being bound to any theory, it is believed that desirable saturated reds and chromatic reds may be achieved when the dark and light magenta inks have a lambda cutoff delta greater than or equal to 10 nm. In a non-limiting example, the difference in the red/green lambda cutoff between the dark and light magenta inks is about 16 nm.

Figure 1:
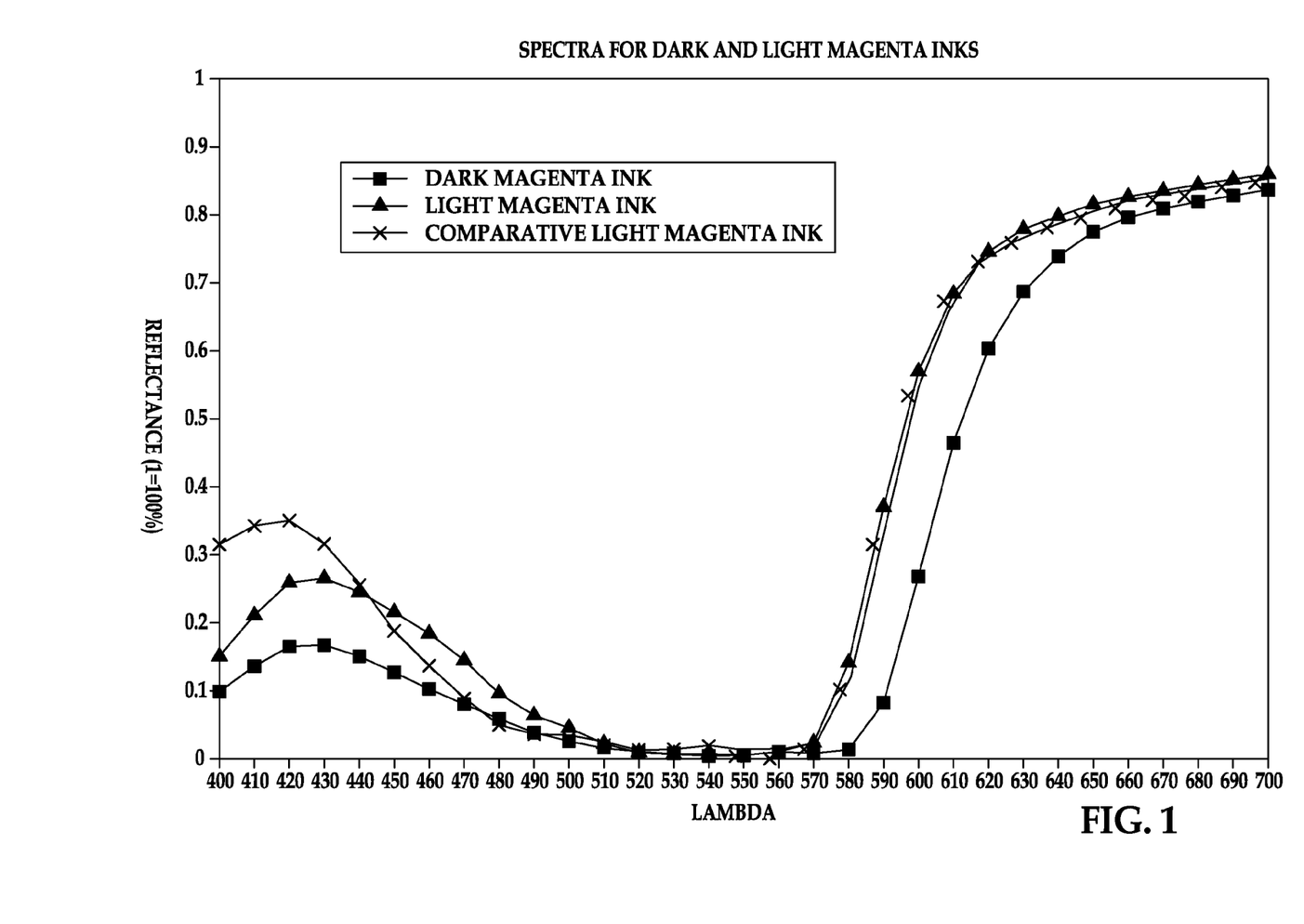
FIG. 1 is a graph depicting spectra for an embodiment of a light magenta ink including CROMOPHTAL® Jet Magenta 2BC (Ciba, Terrytown, N.Y.), an embodiment of a dark magenta ink including pigment red 122, and a comparative light magenta ink including pigment violet 19.

FIG. 1 illustrates the spectra for a pigment suitable for use in the light magenta ink disclosed herein, for a pigment suitable for use in the dark magenta ink disclosed herein, and for a comparative pigment which is generally not suitable for use in either the light or the dark magenta inks disclosed herein. The pigment for the light magenta ink is CROMOPHTAL® Jet Magenta 2BC, and the pigment for the dark magenta ink is PR 122. The comparative pigment is pigment violet 19 (PV 19).

The spectra shown in FIG. 1 are the reflectance measurements for solutions containing about 4% by weight of the respective pigment, and coated on a glossy microporous media at about 0.50 grams/meter$^2$ (gsm) of the respective pigments. A series of inks having different % solids (e.g., 3%, 4%, 4.5%, 5%, etc.) were printed, and the reflectance was measured. The 4% solids solutions were found to have a density sufficient to achieve a maximum magenta chroma.

As shown in FIG. 1, the spectrum for PR 122 is red shifted, and has a lambda cutoff at about 610 nm. It is believed that these characteristics make this pigment particularly suitable for forming saturated red images. The spectrum for CROMOPHTAL® Jet Magenta 2BC is green shifted (compared to that of PR 122), and has a lambda cutoff at about 595 nm. It is further believed that these characteristics make this type of pigment particularly suitable for forming chromatic red images. While the comparative pigment has a similar lambda cutoff as the CROMOPHTAL® Jet Magenta 2BC, the comparative pigment has less integrated area under the curve and absorbs a larger amount of light at 470 nm. Inks formed with such comparative pigments generally exhibit relatively poor blue chroma.

It is to be understood that embodiments of the ink set disclosed herein may also include additional inks. Non-limiting examples of such inks include black inks, yellow inks, cyan inks, gray inks, orange inks, green inks, blue inks, violet inks, red inks, colorless inks, and combinations thereof. It is to be understood that any of these additional colored inks may be incorporated with light, medium or dark shades, as is desirable. As such, multiple inks of the same color may be included, where each of the inks has a different pigment loading. It is to be further understood that the pigment used in different shades may be the same or different. Furthermore, one or more dilutions of any of the colored inks may be included.

Yet further, embodiments of the ink set disclosed herein may include, in addition to the light magenta ink and the dark magenta ink, other light and/or dark magenta inks. As a non-limiting example, the ink set may include the light and dark magenta inks disclosed herein and another dark magenta ink including the same pigment as the light magenta ink.

In an embodiment of a method of using the embodiment(s) of the ink set disclosed herein, light magenta ink, the dark magenta ink and/or both inks is/are established on at least a portion of the substrate to form an image (i.e., text, graphics, etc.). The amount of ink used depends, at least in part, on the desirable image to be formed.

A non-limiting example of a suitable printing technique includes inkjet printing, such as, for example, thermal inkjet printing, piezoelectric inkjet printing, and/or continuous inkjet printing. Suitable printers include portable inkjet printers (e.g., handheld printers, arm mountable printers, wrist mountable printers, etc.), desktop inkjet printers, large format inkjet printers, or combinations thereof. Generally, each of the inks in the ink set is loaded into a supply assembly (e.g., an ink chamber) that is capable of being operatively positioned in the printer.

In some embodiments, the ink set is provided as a pen configuration, such as, for example, single color pens, dual chamber pens, tri-chamber pens, brick heads, or other pen configurations. In one embodiment, the ink set is a series of tri-chamber inkjet pens or cartridges, where each of the pens includes separate chambers for each of the inks. In still another embodiment, the ink set includes individual or separate inkjet pens or cartridges for each of the inks. The ink set may also be provided in a brick head, where all colors are in respective chambers and on the same head. In a further embodiment, the ink set may be provided in dual chamber pens or cartridges. As a non-limiting example, the ink set is a dual chamber inkjet pen including a chamber for the light magenta ink and a chamber for the dark magenta ink. Additional dual chamber pens may be included to store any other desirable colors.

It is to be understood that the inks disclosed herein may be used with any suitable substrate. A non-limiting example of such a substrate is any microporous media.

To further illustrate the embodiment(s) of the present disclosure, examples are given herein. It is to be understood that these examples are provided for illustrative purposes and are not to be construed as limiting the scope of the disclosed embodiment(s).

EXAMPLE 1

Three ink pairings were tested. The first was CROMOPHTAL® Jet Magenta 2BC with pigment yellow 155 (PY155 at 5% pigment solids) and pigment blue 15:3 (PB15:3 at 2% pigment solids), respectively; the second was pigment violet 19 with PY155 and PB15:3, respectively; and the third was pigment red 122 with PY155 and PB15:3, respectively. The color potential for each ink pairing was determined by printing a two dimensional array of test patches covering a range of potential combinations. The inks were printed on HP Advanced Photo Paper, Glossy. An equivalent media for test purposes would be a microporous silica or alumina based media with finish greater than 30 per ASTM D-523, brightness>=90% per TAPPI T-452, and CIE whiteness>=100 per CIE Ganz82 test method. The printed rows incremented one ink (e.g., one of the magentas) and the printed columns incremented the other ink (e.g., yellow or cyan). The maximum amount of ink printed was 30 gsm total on any square. Each individual ink ranged from 0 to 27 gsm. The test patch for the respective magentas plus yellow and the respective magentas plus cyan were merged to create the gamut profile shown in FIG. 2.

Figure 2:
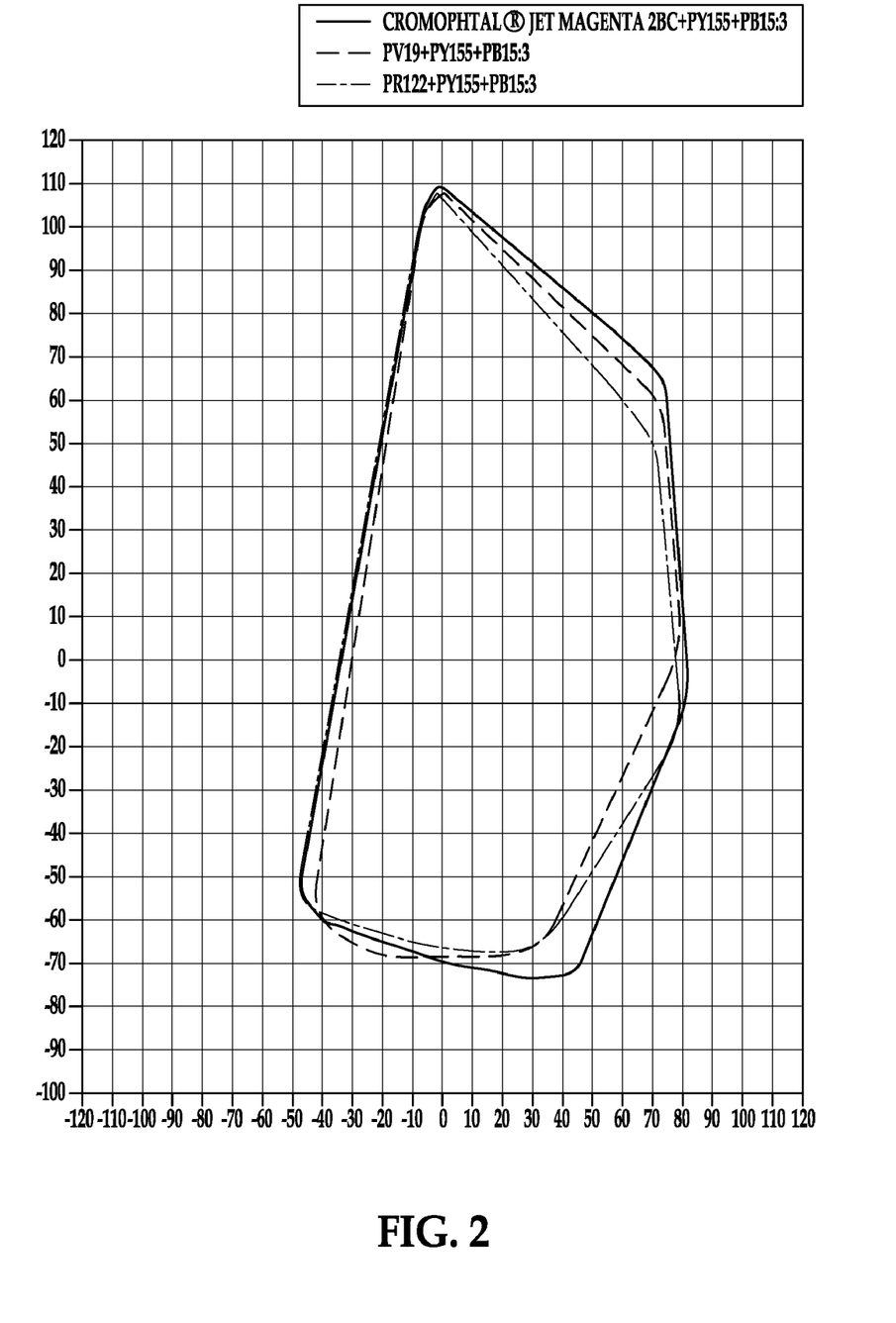
FIG. 2 is a graph depicting a gamut profile for different ink pairings.

It is to be understood that the green portion of the gamut is not shown in FIG. 2 because the graph illustrates those colors made with magenta (i.e., magenta with yellow and cyan).

As depicted in FIG. 2, the CROMOPHTAL® Jet Magenta 2BC results in better blue and better red than either of the PV19 and the PR122.

EXAMPLE 2

The following are theoretical examples of various inks to illustrate the effects of red/green lambda cutoff on chroma (C*), lightness (L*) and hue angle (h*). Generally, the following graphs illustrate that a green shifted lambda cutoff magenta ink results in bright, chromatic red colors having relatively high hue angles; whereas a red shifted lambda cutoff magenta ink results in darker, lower hue angle, saturated red colors.

Figure 3:
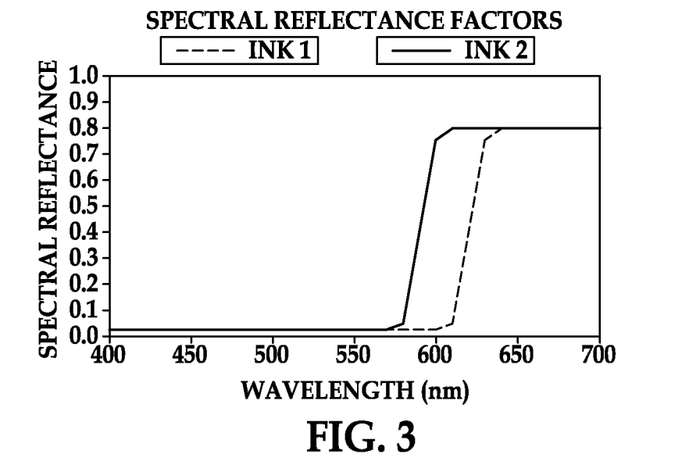
FIG. 3 is a graph depicting theoretical reflectance spectra of an embodiment of a magenta pigment having a red/green lambda cutoff of about 590 nm and an embodiment of a magenta pigment having a red/green lambda cutoff of about 635 nm.

FIG. 3 illustrates the theoretical spectra for Inks 1 and 2, each of which are within the range of red/green lambda cutoffs disclosed herein. As shown in FIG. 3, Ink 2 (which results in high chromatic red) has a lambda cutoff around 590 nm, whereas Ink 1 (which results in maximum red saturation) has lambda cutoff as high as 640 nm.

These theoretical magenta spectra demonstrate that the green shifted cutoff produces more chromatic red, and higher hue angle red. It is believed that selecting the lambda cutoff such that the red hue is substantially similar to Adobe RGB and sRGB when measured under CIECAM is desirable. It is further believed that if the lambda cutoff is green shifted too far, the ink exhibits a red-orange hue, and if the lambda cutoff is red shifted too far, lower chroma results.

In the theoretical spectra of FIG. 3, the reflectance is about 2% within the absorbed wavelength range, whereas the reflectance is about 80% within the reflected wavelength range. It is to be understood that the graphs have been formulated such that the blue wavelengths are absorbed. Such absorption may be achieved by adding a yellow pigment (e.g., PY 74, PY 155, PY 128), or by using a red pigment (PR 149, PR 254, PR 168) instead of a suitable magenta pigment.

The lightness (L*), chroma (C*), and hue angle (h*) of Inks 1 and 2 are shown in Table 1 below. The results indicate that Ink 1 is a dark, saturated red color having a chroma that is less than the chroma exhibited by Ink 2.

TABLE 1

| L*, C* and h* for Theoretical Inks 1 and 2 | | |
|---|---|---|
| | Ink 1 | Ink 2 |
| L* | 34.74 | 52.46 |
| C* | 71.72 | 97.23 |
| h* | 26.40 | 39.85 |

Figure 4:
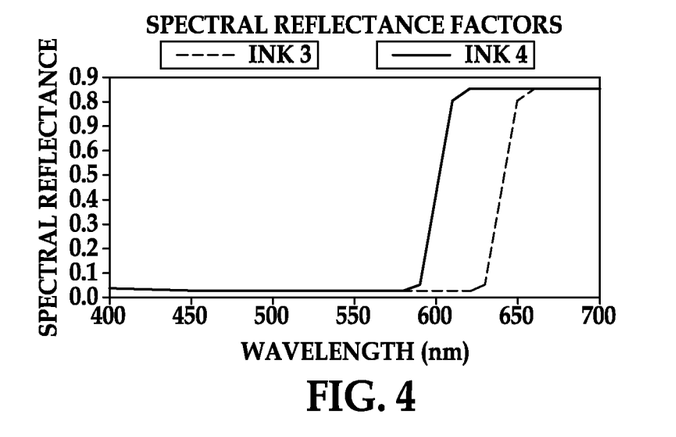
FIG. 4 is a graph depicting theoretical reflectance spectra of an embodiment of two magenta pigments having red shifted lambda cutoffs, which impacts red chroma.

FIG. 4 illustrates the impact on hue and chroma as a function of lambda cutoff. Ink 4 has a green shifted red/green cutoff, and Ink 3 has a red shifted red/green cutoff. These lines represent the maximum chroma reds that two hypothetical magenta pigments are capable of producing, where the difference between the inks is simply the red/green lambda cutoff. Table 2 below illustrates that Ink 4 has higher chroma, lightness and hue angle than Ink 3. It is believed that Ink 4 also has a hue that substantially matches that of Pantone Warm Red.

TABLE 2

| L*, C* and h* for Theoretical Inks 3 and 4 | | |
|---|---|---|
| | Ink 3 | Ink 4 |
| L* | 25.94 | 47.76 |
| C* | 46.55 | 93.36 |
| h* | 19.09 | 34.41 |

Table 3 lists the L*, C* and h* for the most chromatic reds achieved with magenta pigment as a function of lambda cutoff. As depicted in the table, the hue becomes more orange as the lambda cutoff shifts to smaller wavelengths and the chroma and lightness increase.

TABLE 3

| L*, C* and h* for Chromatic Reds Achieved with Magenta Pigment as Lambda Cutoff Increases | | | |
|---|---|---|---|
| Lambda Cutoff | L* | C* | h* |
| 590 | 52.6 | 94.2 | 37.7 |
| 600 | 46.6 | 90.6 | 34.1 |
| 610 | 40.7 | 82.1 | 29.6 |
| 620 | 34.9 | 71.0 | 25.6 |
| 630 | 29.8 | 58.2 | 22.0 |
| 640 | 25.5 | 44.8 | 18.8 |

It is to be understood that any of the magentas in Table 3 may be used to make a red color of any given hue (e.g., from 0 degrees to about 80 degrees) by changing the ratio and amounts of magenta and yellow colorant.

Figure 5:
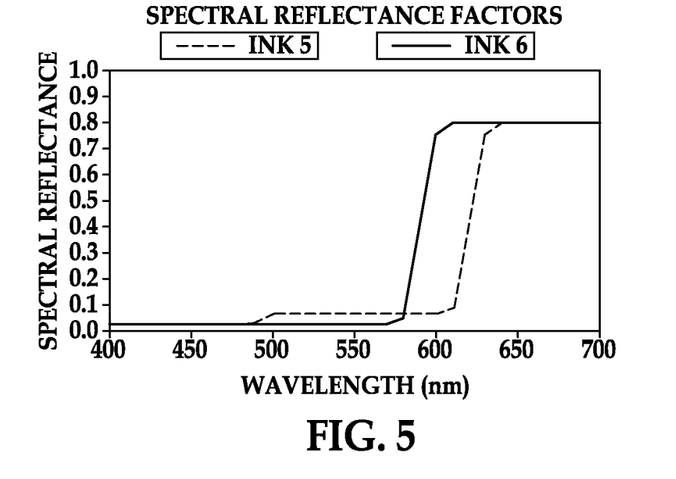
FIG. 5 is a graph depicting theoretical reflectance spectra of an embodiment of a 590 nm magenta pigment and an embodiment of an altered 640 nm magenta pigment such that the pigments have substantially the same hue angle.

FIG. 5 illustrates the theoretical spectra for Inks 5 and 6. Ink 5 includes 640 nm magenta, but is altered to have a 39.8 degree hue to match that of the 590 nm magenta (see Table 4).

In order to accomplish this, a smaller amount of the 640 nm magenta is printed, thereby allowing more green light through. Table 4 illustrates the corresponding L*, C* and h* data for FIG. 5. As depicted, even though the hue is now substantially matched, the Ink 6 (with 590 nm magenta) has much greater chroma and L*.

TABLE 4

L*, C* and h* for Theoretical Inks 5 and 6

|    | Ink 5  | Ink 6  |
|----|--------|--------|
| L* | 41.50  | 52.46  |
| C* | 63.12  | 97.23  |
| h* | 39.80  | 39.85  |

Figure 6:
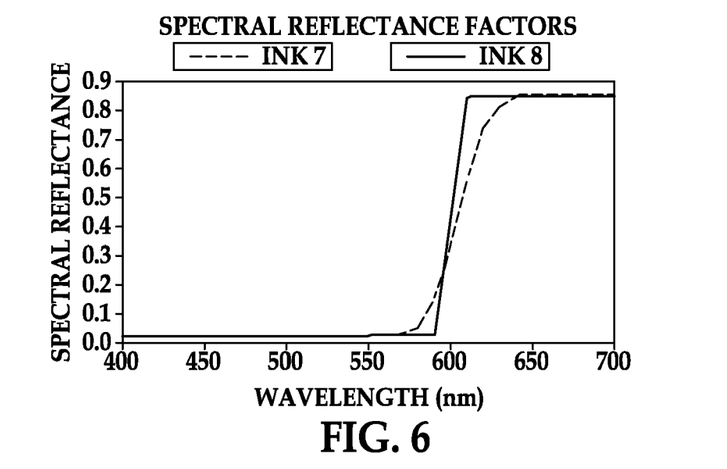
FIG. 6 is a graph depicting theoretical reflectance spectra of an embodiment of two magenta pigments having sharp red/green lambda cutoffs, which impacts red chroma.

FIG. 6 and Table 5 together illustrate how the sharpness of the red/green cutoff impacts red chroma. The hypothetical magenta with the sharper cutoff (Ink 8) has much greater chroma than the hypothetical magenta with the less sharp cutoff (Ink 7). Without being bound to any theory, it is believed that the magenta with the sharper cutoff is capable of reproducing more chromatic reds.

TABLE 5

L*, C* and h* for Theoretical Inks 7 and 8

|    | Ink 7  | Ink 8  |
|----|--------|--------|
| L* | 46.25  | 47.83  |
| C* | 88.72  | 93.84  |
| H* | 34.43  | 34.31  |

Figure 7:
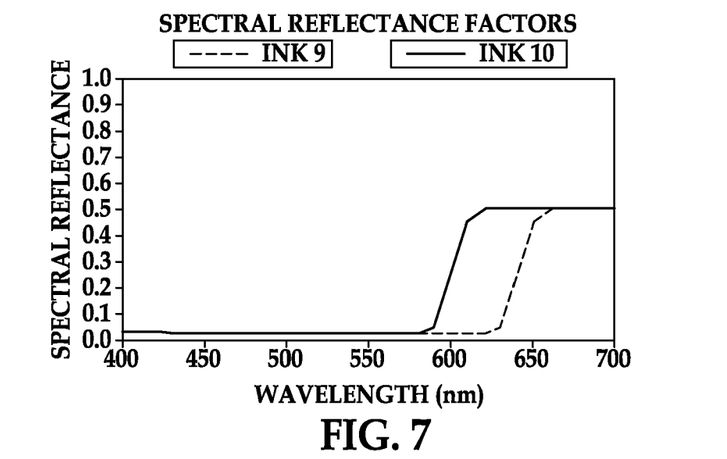
FIG. 7 is a graph depicting theoretical reflectance spectra of an embodiment of two magenta pigments having black pigment added thereto.

A darker color is often obtained when black or gray is added to an ink exhibiting desirable chroma. Theoretical amounts of black are added to Inks 1 and 2 to form Inks 9 and 10, respectively. FIG. 7 and Table 6 illustrate that the hue remains similar to that of the magenta without black (see FIG. 3), but L* and C* decrease. It is believed that generally, the C* and L* linearly decrease as black is added to the color.

TABLE 6

L*, C* and h* for Theoretical Inks 9 and 10

|    | Ink 9  | Ink 10 |
|----|--------|--------|
| L* | 22.58  | 38.69  |
| C* | 32.99  | 71.49  |
| h* | 16.63  | 31.33  |

FIGS. 3-7 also illustrate that the two different magentas create a different hue of red when mixed with yellow. Generally, the green shifted magentas are more orange than the red shifted magentas. In order for the green shifted magentas to have a hue angle similar to that of the red shifted magentas, a small amount of yellow is removed. The two magentas may be formulated to have the same dark red hue and L* by adding black to both magentas (e.g., Inks 1 and 2 form Inks 11 and 12, respectively) and removing a little bit of the mixed yellow from the green shifted magenta (Ink 12).

Figure 8:
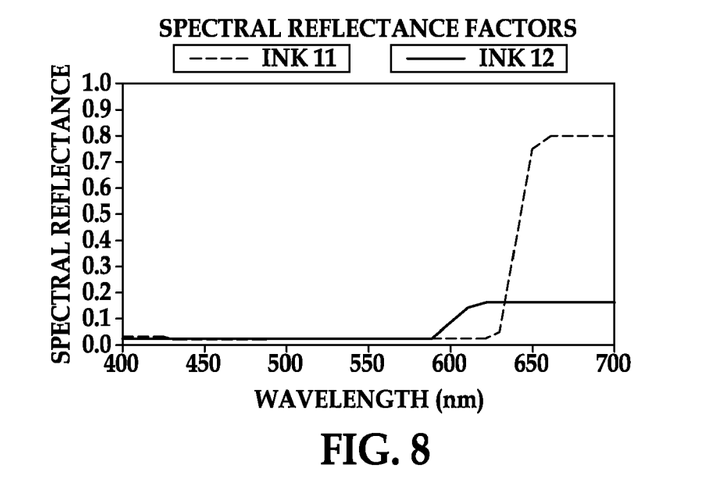
FIG. 8 is a graph depicting theoretical reflectance spectra of an embodiment of two magenta pigments altered to have a similar low hue angle.

FIG. 8 and Table 7 show the results. Ink 11 (i.e., the red shifted magenta) is noted to have much higher chroma, and hence saturation for this lower hue angle red. It is believed that this is due to Ink 12 (i.e., the green shifted magenta) allowing too much green light thru, which raises L*. To counter the raised L*, more black may be added, which fur- ther reduces chroma. As such, red shifted magenta is capable of making more saturated low hue angle reds than a green shifted magenta.

TABLE 7

L*, C* and h* for Theoretical Inks 11 and 12

|    | Ink 11 | Ink 12 |
|----|--------|--------|
| L* | 25.48  | 25.51  |
| C* | 44.82  | 34.38  |
| h* | 18.80  | 18.75  |

While several embodiments have been described in detail, it will be apparent to those skilled in the art that the disclosed embodiments may be modified. Therefore, the foregoing description is to be considered exemplary rather than limiting.

What is claimed is:

1. An ink set, comprising:
a light magenta ink including an effective amount of a pigment having a red/green lambda cutoff ranging from about 585 nm to about 600 nm, and reflecting at least about 14% of blue light at a wavelength of about 470 nm when measured at a density at which the light magenta ink provides a maximum magenta chroma; and
a dark magenta ink including an effective amount of a pigment having a red/green lambda cutoff greater than or equal to about 605 nm;
wherein each of the light magenta ink and the dark magenta ink includes a water-based ink vehicle.

2. The ink set as defined in claim 1 wherein the effective amount of the pigment in the light magenta ink ranges from about 0.7 wt % to about 2 wt %.

3. The ink set as defined in claim 1 wherein the effective amount of the pigment in the dark magenta ink ranges from about 3 wt % to about 6 wt %.

4. The ink set as defined in claim 1 wherein the pigment in the light magenta ink is selected from the group consisting of a mixture of different derivatives of formula (A) and a solid solution of formula (A):

wherein X and Y are each independently selected from the group consisting of a halogen, —OH, —NO$_2$, —CF$_3$, a C$_1$-C$_4$ alkyl group, a substituted C$_1$-C$_4$ alkyl group, branched alkyl groups, unbranched alkyl groups, a C$_1$-C$_4$ alkoxy group, a substituted C$_1$-C$_4$ alkoxy group, a phenyl group, a cyclohexyl group, a phenoxy group, —COOH, a —COO—C$_1$-C$_4$ alkyl group, —SO$_3$H, a phenylamino group, a benzamino group, —N(CH$_3$)$_2$, —SO$_2$NH$_2$, —SO$_2$N(CH$_3$)$_2$, a pyridino group, —CONH$_2$ and —CON(CH$_3$)$_2$, and wherein n is 0, 1, or 2.

5. The ink set as defined in claim 1 wherein the pigment in the dark magenta ink is pigment red 122.

6. The ink set as defined in claim 1, further comprising at least one other ink selected from the group consisting of a black ink, a yellow ink, a cyan ink, a gray ink, an orange ink, a green ink, a blue ink, a violet ink, a red ink, a colorless ink, an other light magenta ink, an other dark magenta ink, and combinations thereof.

7. The ink set as defined in claim 1 wherein the dark magenta ink enhances red saturation when printed on a substrate.

8. The ink set as defined in claim 1 wherein the light magenta ink enhances red chroma, enhances blue chroma, reduces metamerism, or combinations thereof when printed on a substrate.

9. The ink set as defined in claim 1 wherein each of the light and dark magenta inks includes a respective vehicle including solvents, binders, buffers, biocides, viscosity modifiers, surfactants, salts, metal chelating agents, water, or combinations thereof.

10. The ink set as defined in claim 1 wherein the effective amount of the pigment in the dark magenta ink has the red/green lambda cutoff ranging from about 605 nm to about 640 nm.

11. A method for printing an image, the method comprising:
providing an ink set including:
a light magenta ink, including:
a water-based vehicle; and
an effective amount of a pigment having a red/green lambda cutoff ranging from about 585 nm to about 600 nm, and reflecting at least about 14% of blue light at a wavelength of about 470 nm when measured at a density at which the light magenta ink provides a maximum magenta chroma; and
a dark magenta ink, including:
a water-based vehicle; and
an effective amount of a pigment having a red/green lambda cutoff greater than or equal to about 605 nm; and
establishing at least some of the light magenta ink, the dark magenta ink, or combinations thereof on a substrate.

12. The method as defined in claim 11 wherein establishing is accomplished via an inkjet printing technique.

13. The method as defined in claim 12 wherein the inkjet printing technique is selected from the group consisting of thermal inkjet printing, piezoelectric inkjet printing, continuous inkjet printing, and combinations thereof.

14. The method as defined in claim 11 wherein the dark magenta ink enhances red saturation when established on the substrate.

15. The method as defined in claim 11 wherein the light magenta ink enhances red chroma, enhances blue chroma, reduces metamerism, or combinations thereof when established on the substrate.

16. An ink system, comprising:
a first ink chamber including a light magenta ink including an effective amount of a pigment having a red/green lambda cutoff ranging from about 585 nm to about 600 nm, and reflecting at least about 14% of blue light at a wavelength of about 470nm when measured at a density at which the light magenta ink provides a maximum magenta chroma; and
a second ink chamber including a dark magenta ink including an effective amount of a pigment having a red/green lambda cutoff greater than or equal to about 605 nm;
wherein each of the light magenta ink and the dark magenta ink includes a water-based ink vehicle.

17. The ink system as defined in claim 16, further comprising a printer in which the first and second ink chambers are operatively positioned.

18. The ink system as defined in claim 16 wherein the effective amount of the pigment in the light magenta ink ranges from about 0.7 wt % to about 2 wt %, and wherein the light magenta ink is a mixture of different derivatives of formula (A) or a solid solution of formula (A):

wherein X and Y are each independently selected from the group consisting of a halogen, —OH, —NO$_2$, —CF$_3$, a C$_1$-C$_4$ alkyl group, a substituted C$_1$-C$_4$ alkyl group, branched alkyl groups, unbranched alkyl groups, a C$_1$-C$_4$ alkoxy group, a substituted C$_1$-C$_4$ alkoxy group, a phenyl group, a cyclohexyl group, a phenoxy group, —COOH, a —COO—C$_1$-C$_4$ alkyl group, —SO$_3$H, a phenylamino group, a benzamino group, —N(CH$_3$)$_2$, —SO$_2$NH$_2$, —SO$_2$N(CH$^{3)}$$_2$, a pyridino group, —CONH$_2$ and —CON(CH$_3$)$_2$, and wherein n is 0, 1, or 2.

19. The ink system as defined in claim 16 wherein the effective amount of the pigment in the dark magenta ink ranges from about 3 wt % to about 6 wt %, and wherein the pigment in the dark magenta ink is pigment red 122.

20. The ink system as defined in claim 16, further comprising at least one other ink selected from the group consisting of a black ink, a yellow ink, a cyan ink, a gray ink, an orange ink, a green ink, a blue ink, a violet ink, a red ink, a colorless ink, an other light magenta ink, an other dark magenta ink, and combinations there.

21. The ink system as defined in claim 16 wherein the dark magenta ink enhances red saturation when printed on a substrate, and wherein the light magenta ink enhances red chroma, enhances blue chroma, reduces metamerism, or combinations thereof when printed on a substrate.

22. The ink system as defined in claim 16 wherein the effective amount of the pigment in the dark magenta ink has the red/green lambda cutoff ranging from about 605 nm to about 640 nm.

* * * * *

UNITED STATES PATENT AND TRADEMARK OFFICE
CERTIFICATE OF CORRECTION

| | | |
|---|---|---|
| PATENT NO. | : 7,922,800 B2 | Page 1 of 1 |
| APPLICATION NO. | : 11/830931 | |
| DATED | : April 12, 2011 | |
| INVENTOR(S) | : Stephen W. Bauer et al. | |

It is certified that error appears in the above-identified patent and that said Letters Patent is hereby corrected as shown below:

In column 10, line 35 in Claim 18, delete "—$SO_2N(CH^{3)}{}_2$," and insert -- —$SO_2N(CH_3)_2$, --, therefor.

In column 10, line 46, in Claim 20, delete "there." and insert -- thereof. --, therefor.

Signed and Sealed this
Eighth Day of November, 2011

David J. Kappos
*Director of the United States Patent and Trademark Office*